United States Patent [19]
Youkin

[11] 3,883,957
[45] May 20, 1975

[54] DIRECTIONAL GYRO INDICATOR SYSTEM

[75] Inventor: James R. Youkin, Fayetteville, Ark.

[73] Assignee: Edo-Aire Mitchell Industries, Inc., Mineral Wells, Tex.

[22] Filed: Aug. 21, 1973

[21] Appl. No.: 389,622

Related U.S. Application Data

[63] Continuation-in-part of Ser. No. 240,382, April 3, 1972.

[52] U.S. Cl. .......................... 33/318; 33/324; 74/5.6
[51] Int. Cl. ............................................. G01c 19/34
[58] Field of Search .......... 33/318, 317, 324; 74/5.6

[56] References Cited
UNITED STATES PATENTS

| | | | |
|---|---|---|---|
| 2,360,399 | 10/1944 | Chandler | 33/318 |
| 2,704,457 | 3/1955 | Gabrielson et al. | 74/5.6 |
| 2,796,594 | 6/1957 | Chombard | 340/27 |
| 3,091,127 | 5/1963 | Depp | 33/317 X |
| 3,455,030 | 7/1969 | Owens et al. | 33/324 |

Primary Examiner—William D. Martin, Jr.
Attorney, Agent, or Firm—Richards, Harris & Medlock

[57] ABSTRACT

The specific discloses a directional gyro indicator for aircraft having a barrel carrying a heading card at the front end of the barrel, with a directional gyro supported behind the barrel. The barrel is rotatably supported by a single roller on the underside thereof. A pair of rollers bear against the upper portion of the barrel and are adjustable to center the heading card. A tracking disk is rotatably mounted on a vertical outer gimbal axis of the gyro, with a pickoff provided for detecting the angular displacement between the tracking disk and the outer gimbal. A transmission means couples the disk and the barrel for equal rotation and a servo motor drive operates the transmission means in response to the error signal from the pickoff for slaving the disk to the gyro.

11 Claims, 11 Drawing Figures

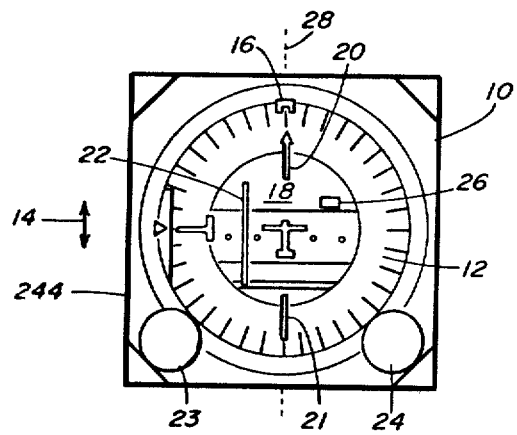
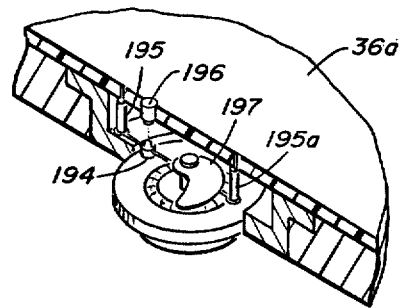
FIG. 1      FIG. 4
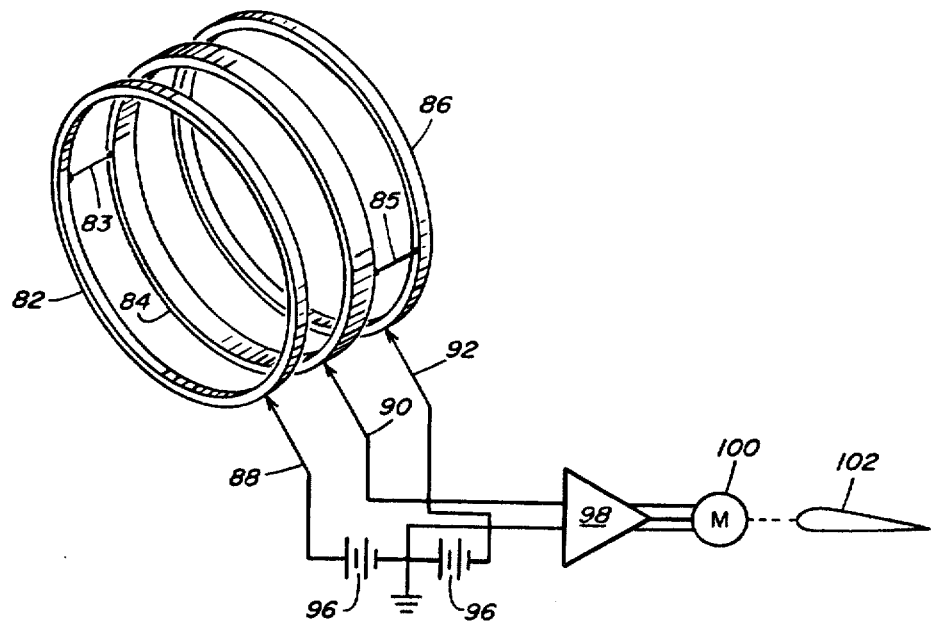
FIG. 2a

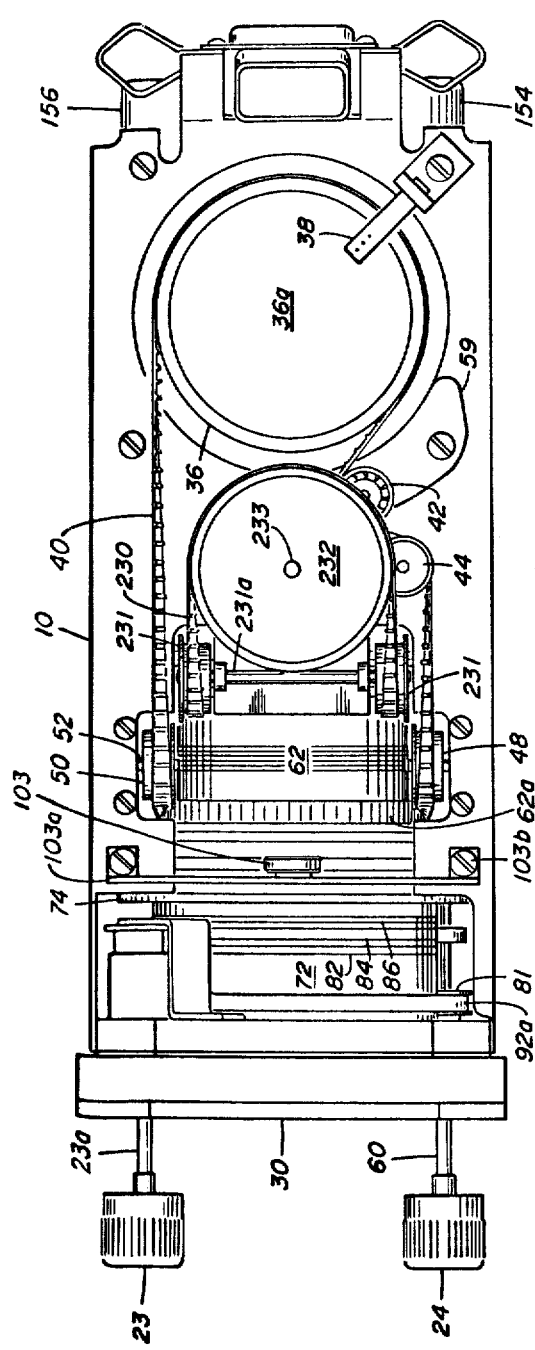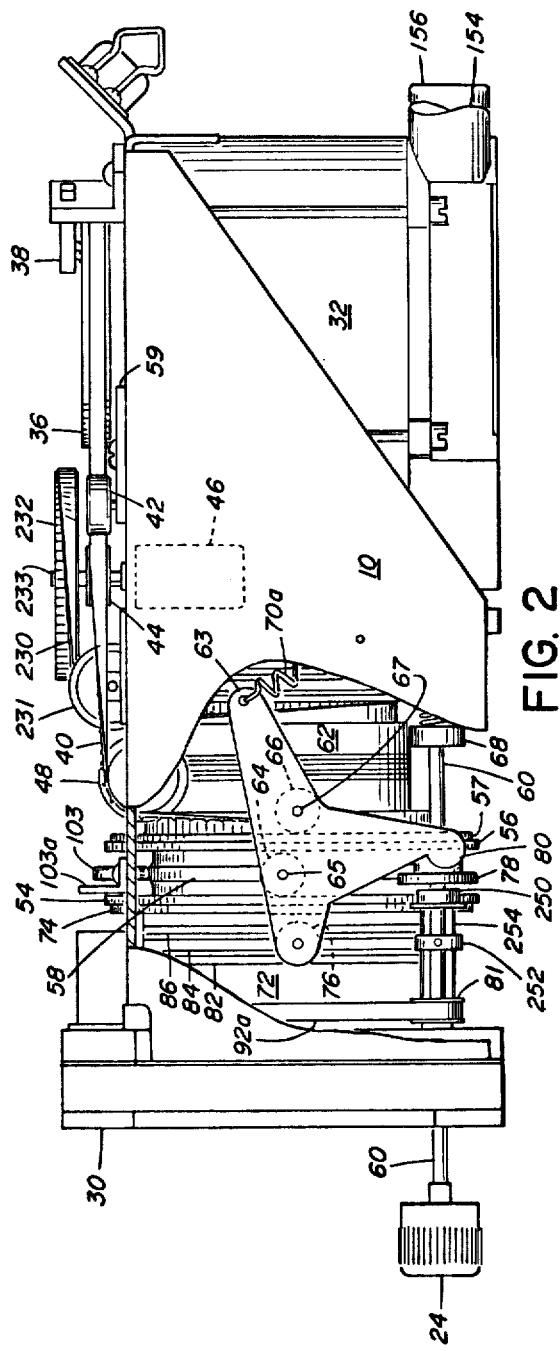

PATENTED MAY 20 1975

DIRECTIONAL GYRO INDICATOR SYSTEM

RELATED APPLICATIONS

This application is a continuation-in-part of Ser. No. 240,382, filed Apr. 3, 1972, and entitled "Directional Gyro Indicator System."

This invention relates to a direct readout directional gyro, and more particularly to a support system for a barrel carrying a rotatable heading card in combination with a linkage between a gyro and the heading card for setting the gyroscope and for course selection.

BACKGROUND OF INVENTION

Aircraft instrumentation is provided to assist the pilot in understanding flight situations at any instant. The utility of flight instruments is directly related to the ability to present information in a manner readily understandable and accurately indicative of the operation and attitude of an aircraft relative to a desired attitude or path either in elevation or in azimuth. Prior art systems have provided compact integrated displays which portray the horizontal situation of an aircraft in any one of several available modes.

Displays of the type to which the present invention is directed provide, in a single instrument such as would be mounted in the instrument panel of an aircraft, the following elements:

a. A heading card cooperating with a heading marker to provide for selection and indicating the aircraft heading in the heading mode. The card is in the form of a flat ring suitably scaled in a compass format on the face thereof. The marker is movable relative to the card for selecting a desired heading.

b. Centered in the ring is a radio display which provides a horizontal situation indication when in either localizer mode or omni mode. Basically, a meter movement is provided to be responsive to deviation from a radio path to indicate such displacement to the pilot. The movement of the meter needle across the face of the radio display indicates the extent of the displacement from the radio path.

c. A meter actuated unit responsive to a radio signal to provide a "to-from" indication to the pilot.

d. A meter actuated unit responsive to a radio signal to provide a glide slope indication on the face of the display.

The previously described copending patent application Ser. No. 240382 discloses a directional gyro indicator wherein a barrel having a heading card at one end is rotatably supported at the opposite end. A pair of rollers support the barrel on the underside to enable rotation of the barrel. A directional gyro is mounted behind the barrel and a transmission belt interconnects a tracking disk mounted on the gyro to the barrel. While the gyro indicator disclosed in the above - noted copending application works well in practice, problems have heretofore arisen in exactly centering the heading card. A need has thus arisen for an improved system for rotatably supporting the barrel while enabling simple and accurate centering adjustment of the heading card.

The present invention is directed to an arrangement of components for rotatably supporting a heading card barrel with structure for enabling accurate centering adjustment of the heading card.

More particularly, in accordance with the present invention in one aspect, a direct readout directional gyro is provided for an aircraft wherein a housing is adapted to be mounted in an aircraft instrument panel. The housing has an exposed heading card mounted in a barrel which is rotatable about a predetermined axis. The barrel is supported by a rearward bearing and by a roller on the underside thereof. A pair of rollers are mounted above the barrel and may be adjusted to center the heading card in the housing. A gyroscope in the housing has a vertical output shaft with a tracking disk mounted for rotation about the vertical axis which carries a sensing means to sense the position of the disk relative to the gyroscope. A belt couples the tracking disk to the heading card with a motor drive connected to the belt and is responsive to variations in the position of the tracking disk relative to the gyroscope for slaving the tracking disk to the gyroscope and for rotating the card proportional to the displacement of the housing relative to the gyroscope. A release means uncouples the heading card permitting rotation of the heading card relative to the gyroscope.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a view of the instrument face of the present invention;

FIG. 2 is a side view of one embodiment of the invention;

FIG. 2a is a perspective view of the pickoff with associated circuit therefor;

FIG. 4 is a partial perspective view of the tracking disk;

FIG. 5 is a top view of the unit of FIG. 2;

DESCRIPTION OF THE PREFERRED EMBODIMENT

FIG. 1

Figure 3:
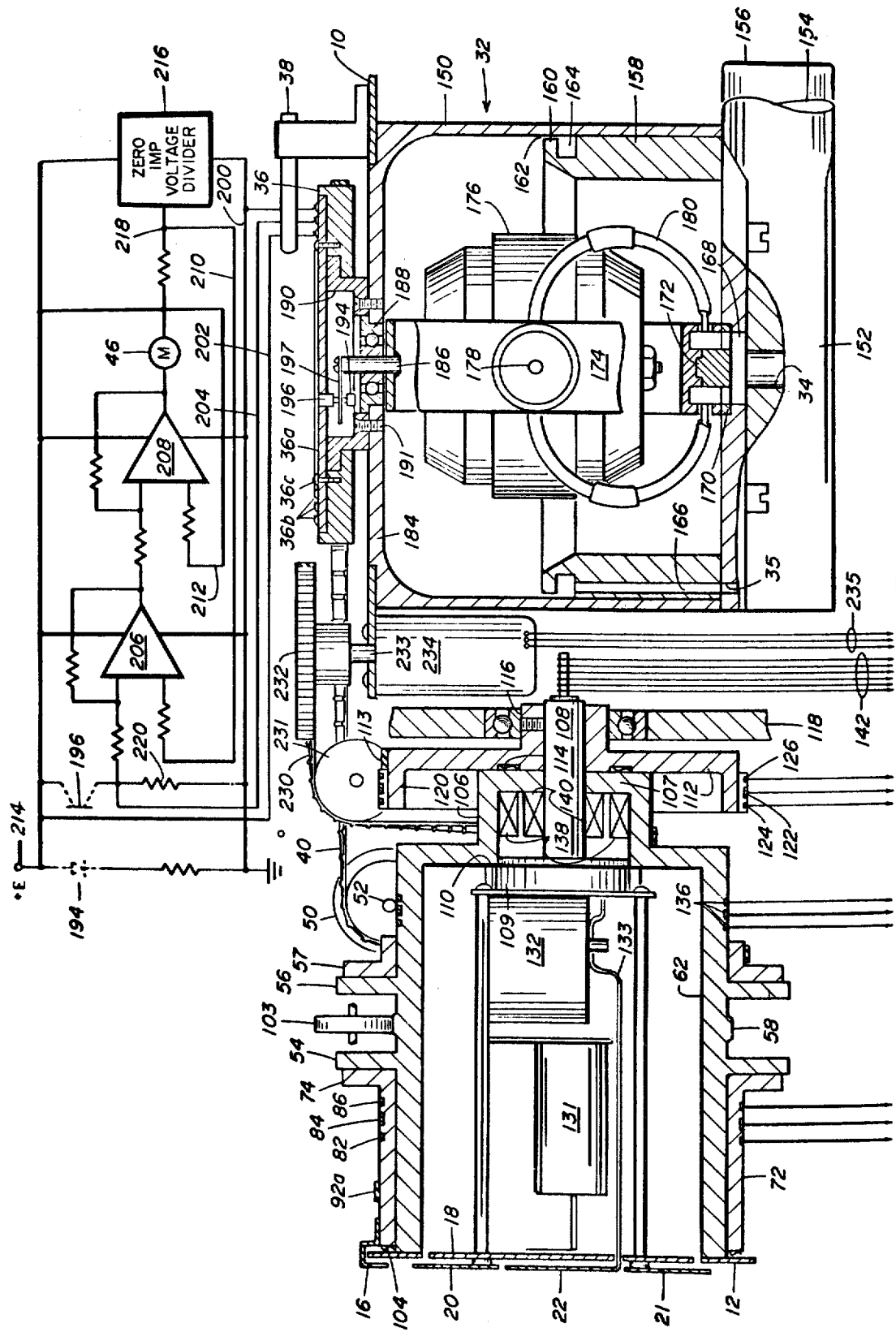
FIG. 3 is a fragmentary diagrammatic representation of elements of FIG. 2.

Referring now to FIG. 1, the face of the directional gyro unit comprising the present invention has been illustrated. The display is conventional and heretofore known. It involves a housing 10 which in one embodiment was adapted to fit into a three inch by three inch opening in an aircraft instrument panel. Prominent on the face of the instrument is a heading card 12 in the form of a flat ring. The card is adapted to be rotated as indicated by arrow 14. The card is marked with legends, N, E, S and W, the four points of the compass and bears a scale similar to a compass with ten degree points so marked.

A heading marker 16 is mounted adjacent the periphery of the card 12. As will be described, marker 16 is mounted on structure permitting it to be rotated relative to card 12 or with card 12.

A radio display unit 18 centered in card 12 is rotatable relative to card 12 or with card 12 as will later be shown. The radio display unit 18 comprises a central disk which carries upper and lower pointers 20, 21 forming an omni bearing selector. Pointers 20, 21 are aligned and serve to provide an indication as to the selection of a desired radio controlled course. A meter movement is provided to support and control the position of a center segment 22. When the segment 22 is in alignment with the segments 20 and 21 when the aircraft is in the omni mode or the localizer mode, the aircraft is flying directly along the radio defined path. When the aircraft is displaced from the radio defined path, the segment 22 is displaced to the right or to the left of the center of the radio display in an amount dependent upon the extent of the aircraft displacement from the path.

Also on the radio display is a meter controlled indication of the direction of flight of the aircraft relative to a radio station when localizer mode indicating to the pilot that he is flying either toward or from the station. Operation in the omni mode is also signified by a legend appearing in window 26.

Two control knobs 23 and 24 are provided. Control knob 24 is associated with the heading card 12 and marker 16. Control knob 23 is associated with the radio display 18.

In accordance with the present invention, knob 24 may be rotated to set the heading marker 16 relative to the heading card 12. When marker 16 is moved, a pickoff is correspondingly rotated to induce an unbalance signal in an associated autopilot system which causes the plane to bank and turn until the aircraft flies a course indicated by the position of marker 16 on the heading card 12 with the card 12 and marker 16 stopping when marker 16 is at the vertical axis 28.

The knob 24 may be employed for a second adjustment. By pushing it towards the face of the instrument and rotating the marker 16 together with the heading card 12, the DG system may be set to correspond with a compass heading.

Knob 23 is rotated to set the radio course, that is to cause the pointer 20 to register at the desired heading of the radio defined path on the scale carried by the heading card 12. For example, in localizer mode, marker 16 would be set to the runway heading and the pointer 20 would be set to the same heading. The aircraft would then be caused to fly to and then along the localizer radio beam, flying the aircraft along a course until there is no offset or displacement in the segment 22 relative to pointers 20 and 21.

FIG. 2

The system for accomplishing the foregoing function is illustrated in FIGS. 2–7. In FIG. 2 the system of the present invention is shown in the side view. Knob 24 is shown in the front of the face panel 30 which is adapted to be secured to the aircraft frame. The housing 10 is generally rectangular in shape and supports at the rear end thereof a vertical gyro assembly 32. The gyro 32 in this embodiment is an air driven gyro having air inlet and outlet ports 34 and 35. The gyro is provided with a belt driven tracking disk 36 which provided with slip rings and is mounted for rotation on the vertical output axis of the gyro assembly 32. A brush support 38 is secured to housing 10 and extends above disk 36 and carries brushes for the transmission of signals and energizing current to and from a pickoff in the tracking disk 36. The tracking disk 36 is encircled and driven by a timing belt 40 which runs along the horizontal path to an idler roller 42, and then around a motor driven sprocket 44, and over a pair of idlers 48–50 which are mounted on a shaft 52. The shaft 52 is perpendicular to the axis of the gyro assembly 32.

The belt 40 then courses downward around a barrel 62 which supports the heading card 12 (not seen in FIG. 2) at its front end. Barrel 62 is smaller in diameter than disk 36. Barrel 62 has two coaxial large diameter rings 54 and 56 integral therewith and a smaller diameter ring 58 positioned between rings 54 and 56. A flanged ring 57 is mounted on barrel 62 adjacent to ring 56 and is rotatable on barrel 62. The flange on ring 57 is toothed to mesh with belt 40 and is of the same diameter as tracking disk 36.

Timing belt 40 has preferably a ribbed surface positively to mesh with the drive gear 44 with teeth on the periphery of the tracking disk 36 and with teeth on the flange of ring 57.

The drive motor 46 for the drive sprocket 44 is mounted in housing 10 with the motor shaft extending directly upward to support and drive sprocket 44. Idler 42 is adjustable in its position to tighten belt 40 by adjusting the position of the end of arm 59. By this arrangement rotation of motor 56 rotates tracking disk 36 and ring 57 on heading barrel 62 through equal angles.

Unbalance or error signals from a sensor in tracking disk 36 are employed in a servo loop to drive motor 56a to slave the tracking disk 36 to gyro assembly 32. As this is done, the motor 56a drives belt 40 causing the tracking disk 36 to follow and be maintained in a predetermined relation with respect to ring 57. Any movement of the tracking disk is accompanied by equal rotation of ring 57 on barrel 62. The front face of ring 57 and the rear face of ring 56 are mating clutch surfaces. With the clutch engaged, motion of ring 57 is transmitted to barrel 62 via ring 56, thus forcing barrel 62 to track the tracking disk 36. A flange 68 is pinned to shaft 60 and engages a spring 70, the rear end of which engages the inner race of a bearing 71 which supports the rear end of shaft 60. Spring 70 urges shaft 60 forward.

When this is the case, the heading card 12 on the front end of barrel 62 is rotated in synchronism with rotation of the tracking disk 36. When the clutch 56–57 is not engaged, then barrel 62 may be rotated independently of the tracking disk 36.

The clutch disks 54 and 56, together with disk 57, are shown in conjunction with three rollers operated by a bell crank 63. More particularly, a roller 64 is mounted on a shaft or pivot 65 which is mounted on the frame 10. Crank 63 also pivots on shaft 65. Roller 64 is positioned in the space between rings 54 and 56, both of which are integral with barrel 62. Preferably there is very slight clearance (0.001 inch) between the periphery of roller 64 and the confronting surfaces of rings 54 and 56. Roller 64 is mounted for free rotation on shaft 65.

A second roller 66 is mounted on a shaft 67 which in turn is mounted on bell crank 63. The edge of roller 67 is positioned to engage the rear surface of the flanged ring 57. A spring 70a is secured at one end to the rear end 69 of bell crank 63 and at the other end to frame 10 so that the bell crank 63 normally is biased in a clockwise direction forcing the flanged ring 57 into engagement with ring 56. By this means the barrel 62 rotates with the flanged ring 57 and is forced to track the tracking ring 36.

A short cylinder 72 is mounted on the front of barrel 62. A flange 74 is formed at the rear end of cylinder 72. The rear surface of flange 74 and the front surface of ring 54 form a second slip clutch. The friction between cylinder 72 and barrel 62 normally is adequate to cause the cylinder 72 to rotate with and thus follow barrel 62. However, when bell crank 63 is rotated counterclockwise, a third roller 76 mounted on the front of bell crank 63 is forced into contact with the rear surface of flange 74, forcing flange 74 and ring 54 together while releasing pressure between rings 56 and 57. A flange 78 on shaft 60 is positioned adjacent to the lower end 80 of bell crank 63. When knob 24 is pushed in, it releases the clutch 56, 57 and further increases the friction in clutch 54, 74. A sprocket 81 on shaft 60 is belted to a toothed section on the front end of cylinder 72. Thus, when knob 24 is depressed and rotated, the cylinder 72 is rotated and barrel 62 is rotated by an equal amount because of engagement of clutch 54, 74. This rotates the heading card on the front end of barrel 62. This clutching arrangement permits the selection of a new heading through use of the autopilot associated with the system by merely rotating cylinder 72. The linkage also permits rotation of barrel 62 to reset the system to a compass when desired.

Cylinder 72 is encircled by three rings. The front ring 82 is a slip ring. The center ring 84 is a continuous potentiometer. The rear ring 86 is a slip ring.

Rings 84–86 form a pickoff for the autopilot system. The circuit in which they are employed is diagrammatically illustrated in FIG. 2a wherein the rings are shown separate and apart from their mounting. Ring 82 is a continuous conductor. It is connected by way of a bar 83 to a point on ring 84 which is s resistance element of the type to serve as a potentiometer element. Ring 86 similarly is a continuous conductor connected by a bar 85 to a point on ring 84 which is diametrically opposite to the connection of bar 83.

Three fixed wipers 88, 90 and 92 engage rings 82, 84 and 86, respectively. Wipers 88 and 92 are connected in circuit with a center tap battery 96. The center tap of battery 96 is connected to ground. The wiper 90 associated with ring 84 is connected to a amplifier 98 whose output is applied to a motor 100 to control ailerons represented by the element 102. When wiper 90 is midway between the points of connection of bars 83 and 85, the system in nulled and the signal to amplifier 98 is zero and motor 100 is not energized. However, if the cylinder 72, FIG. 2, is rotated, ring 84 moves relative to wiper 90, thus unbalancing the servo system in an amount proportional to the rotation of cylinder 72 and in a sense dependent upon the direction of rotation of cylinder 72. This unbalance causes the motor 100 to operate the control surfaces to bank and turn the aircraft until the signal from ring 84 is again null. This is accomplished by motor 46 driving the tracking disk 36 to follow the gyro 32 as the plane turns. Disk 36 is coupled to barrel 62 by belt 40, flanged ring 57 clutched to ring 56 which turns barrel 62. Barrel 62 carries cylinder 72 with it, moving ring 84 relative to wiper 90. This continues until the signal to amplifier 98 is zero.

FIG. 3

Certain portions of the system are shown diagrammatically in FIG. 3 which is presented in order to assist in understanding the structure shown in FIG. 2.

Heading barrel 62 in this embodiment is an elongated cylinder open at the front end thereof and supporting heading card 12. Ring 54 is engaged by two rollers (103a–b shown in FIG. 8 and spaced 120° apart) beneath barrel 62 to maintain it in a predetermined position within housing 10. A third roller 103c engages ring 58 at the top to provide the three point support for barrel 62. Cylinder 72 is rotated by belt 92a which meshes with gear 81 on shaft 60, FIG. 2. A wave washer 104 positioned between the rear surface of bearing card 12 and the front end of cylinder 72 urges flange 74 at the rear of cylinder 72 against ring 54 to provide a low torque slip clutch coupling between cylinder 72 and ring 54.

Barrel 62 has a rear closure with a coaxial cylindrical extension 106 which in turn is closed by a disk 107. A center hole through disk 107 receives a shaft 108 which serves to support the radio display unit 18.

The radio display unit 18 is positioned inside the heading barrel 62 and is integral with shaft 108. Near the rear end of unit 18 is a disk 109 which thus closes extension 106. The bearing surfaces between disk 109 and the mouth of extension 106 forms a slip clutch 110. A disk 112 is fixed on shaft 108 back of closure 107. A wave washer 114 urges the radio display unit 18 rearward in heading barrel 62. Shaft 108 is journalled in bearing 116 in a plate 118 extending across the housing 10.

Integral with disk 112 is a short cylinder 120 which supports a potentiometer ring 122 and two slip rings 124 and 126. The wipers for the potentiometer ring and slip rings 122, 124 and 126 are insulated from and supported by housing 10.

The radio display per se is not new in that heretofore, a meter such as a meter 132 has been provided. Meter needle 133 extends through a slot 134 in the face of display unit 18 and outer segment 22.

In the present case, however, circuits are provided for the radio display via three slip rings 136 mounted on the exterior of the heading drum 62. They provide for electrical circuits leading to magnetic coils 138 on the interior of the cylindrical extension 106. Cooperating coils 140 are mounted on shaft 108. Coils 138 and 140 are shown to represent a synchro resolver of conventional nature. The radio guidance unit usually is set by the synchro resolver to an angle corresponding to the magnetic course or heading to be followed with the heading card 12 set to correspond with a magnetic compass heading. The resolver is then employed in the known manner to fly the aircraft to the desired course. Thus, the coils 138 and 140 are shown schematically.

A set of slip rings 142 on the end of the shaft 108 provide for circuits which extend to meters 131 and 132 and to coil 140. Thus, six slip rings are provided in set 142.

The gyro 32 is illustrated in FIG. 3 as comprising a cylindrical housing 150 having a bottom closure 152 that has an air input tube 154. Cylinder 150 is thin walled and includes a cylindrical insert 158 in the bottom which is thick walled. The upper end of the insert is inwardly tapered at section 160 and is of smaller outer diameter than the inner diameter of cylinder 150 so that there is thin annular passage 162 leading to an annular chamber 164. Chamber 164 is connected as by way of the longitudinal passage 166 to an exhaust tube 156. Pressurized air to drive the gyroscope in cylinder 150 enters by way of tube 154 which leads to central passageway 168. A perforated closure member 170 in the bottom of cylinder 150 is provided with a support pin 172 for an outer gimbal 174 which supports gyro 176. Gyro 176 is mounted on gimbal 174 for rotation about axis 178. Air flows around pin 172 and thence by way of tubes 180 to the shaft 178 to drive a rotor in the gyroscope 176.

Tracking disk 36 is positioned above the upper closure member 184 of cylinder 150. A pin 186 is fixed in a hole in the upper segment of gimbal 174. Pin 186 is journaled in a bearing 188 which is mounted in closure member 184. A flanged cylinder 190 is mounted on top of closure member 184, secured by screws 191. Tracking disk 36 has an upper plate 36a on which slip rings 36b are mounted. Disk 36 and plate 36a are coupled together by fasteners 36c so that disk 36 is captured on the flanged cylinder 190 and may rotate thereon when driven by belt 40.

A light source 194 is mounted on a rod 194a depending from tracking disk 36a and preferably is a light emitting diode. A photodiode 196 is mounted on plate 36a on the side of an opaque vane 197 opposite source 194. Vane 197 is carried on the end of pin 186 and moves with gyro gimbal 174.

Three wipers are mounted on support 38 to provide for two circuits leading, by way of the three slip rings on plate 36a, to conductors 200, 202 and 204.

An error signal, produced upon displacement or movement of the outer gimbal 174 relative to the tracking disk 36, is employed to control motor 46. The servo circuit for motor 46 includes operational amplifiers 206 and 208. The circuit for driving motor 46 employs regenerative feedback to amplifier 208 by way of channel 210 and feedback to amplifier 206 by way of feedback path 212. Conductor 202 is common to the light source 194, the photodiode 196, and the positive terminal of a current source 214. Source 214 supplies operational amplifier 206 and operational amplifier 208 as well as a zero impedance voltage divider 216. At point 218 there is provided a voltage equal to one-half the voltage of the source 214. Line 200 is connected to ground and, by way of resistance 220, to conductor 204 which leads to the input of the amplifier 206. The circuit is operated such that the voltage at the output of amplifier 206 is proportional to the velocity of the motor 46. The amplifier 208 in this circuit operates as a velocity bridge equivalent.

FIG. 4

In FIG. 4 the vane 197 mounted on the top of the pin 186 on the outer gimbal 174 is shown in relation to the light source 194. The detecting photodiode 196 is mounted in disk 36. The light sensitive pickoff thus operates on an edge of vane 197 to slave the disk 36 to gimbal 174.

The diode 194 is shown supported on its own leads from two posts 195 and 195a and is so positioned to illuminate detector 196. Vane 197 thus is positioned to interrupt light reaching detector 196 from source 194.

As will be seen in FIG. 3 there are four belts operating in the system. At the front heading belt 92a is coupled to shaft 60. Gyro belt 40 couples the clutch ring 57 to the tracking disk 36. Course belt 113 connects the disk 112 to a pulley on shaft 23a, permitting adjustment through actuation of knob 23 of the radio display unit 18.

A fourth belt 230 encircles the cylindrical extension 106 of barrel 62 and passes over a pair of idlers such as idler 231 and thence around a pulley 232. Pulley 232 is mounted on a shaft 233 of a synchronous control transformer of resolver 234. Belt 230 is a slaving belt which slaves the cylinder 62 to the resolver 234. Resolver 234 then provides an output on channel 235 indicative of heading. This signal may be compared with a flux gate and any error signal used to excite a torquer to slave a gyro to the flux gate. No such provision is included herein. Rather, provision is made for generating the heading information. It may then be used as above noted or in any other manner desired.

In FIG. 5 the top view of the unit is shown. In this figure, the belt 92a is shown encircling the cylinder 72 to couple the same to the sprocket 81. The slip rings 82, 86 and the potentiometer 84 are shown encompassing the cylinder 72 with the flange 74 adjacent the ring 54.

Figure 8:
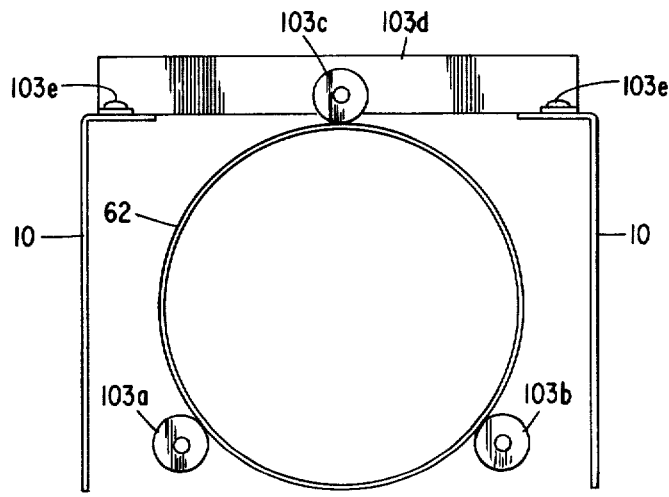
FIG. 8 is a front view of the support system for the barrel shown in FIGS. 1–7, with the heading card removed.

As shown in FIGS. 5 and 8, the top roller 103 is supported by a bracket 103d which spans the top of the frame 10 and is secured thereto as by screws 103c. Rings 56 and flange 57 are shown with their confronting faces positioned together. Belt 40 encircles barrel 62 in the toothed track 62a. Idlers 48 and 50 are supported by shaft 52 which is journaled in bearing blocks 52a at the ends thereof.

Idlers 231 are supported on shaft 231a and supports belt 230 as it courses around the pulley 232. The pulley 232 is mounted on shaft 233 as above explained to drive the synchro controlled transformer 234.

Idler 42 supported on adjustable arm 59, drive pinion 44, and tracking disk 36 are shown in their relative positions. Brush support arm 28 extends above tracking disk 36 to provide for circuit extending from the slip rings on disk 36.

Figure 6:
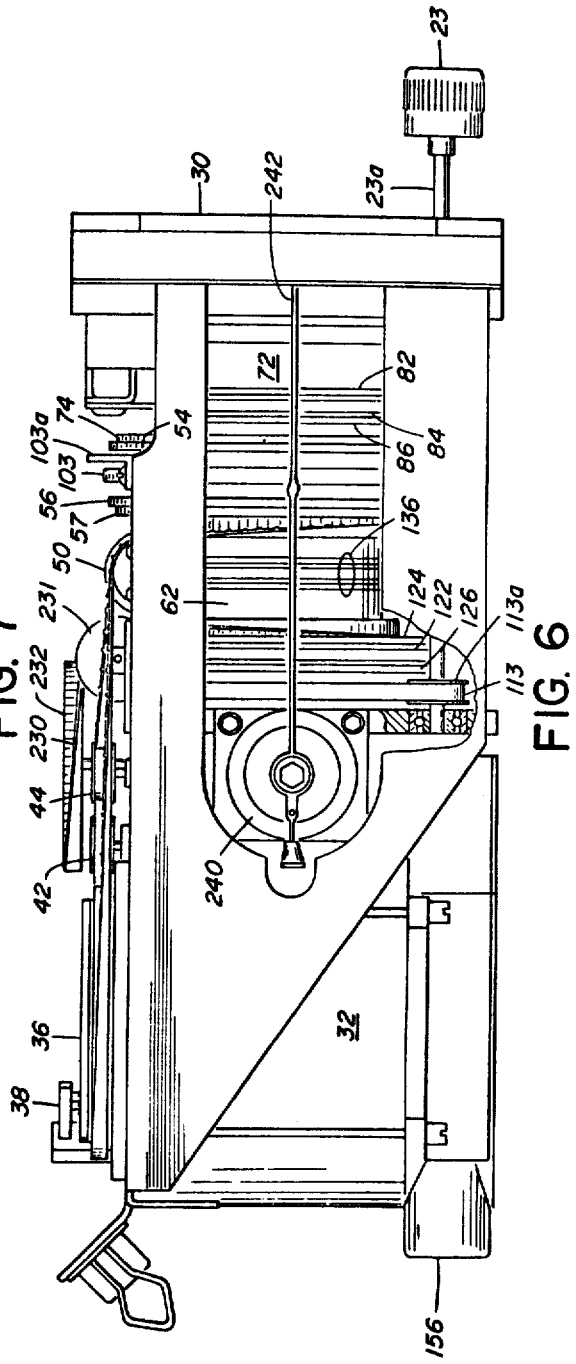
FIG. 6 is a view of the side of the unit opposite that shown in FIG. 2.

FIG. 6 illustrates the left side of the unit. In this view the shaft 23a is shown as it supports pinion 113a over which belt 113 passes and from which belt 113 extends to encompass the course command pulley 112.

Also shown in FIG. 6 is a glide slope indicating meter 240 which has a meter arm or needle 242 extending to the front face of the unit to provide a glide slope indication 244, FIG. 1. Such provisions are conventional and are included in the present system.

Figure 7:
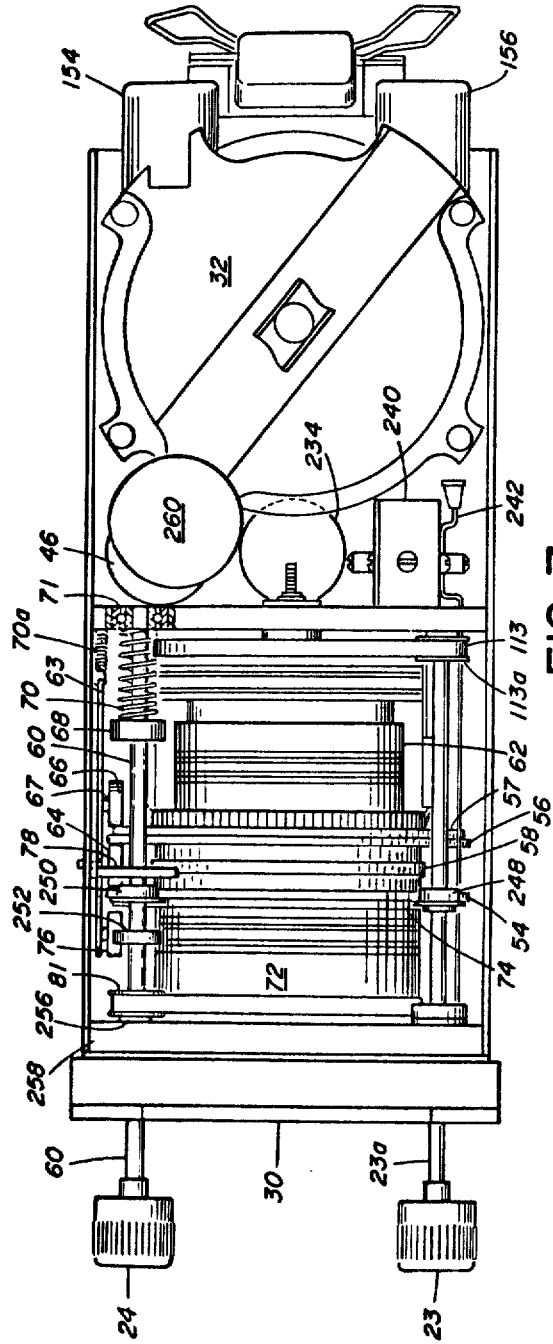
FIG. 7 is a bottom view of the unit of FIG. 2.

FIG. 7 is a bottom view of the system. The two lower support rollers for barrel 62, namely rollers 248 and 250, are mounted on shafts 23a and 60, respectively. The rollers 248 and 250 are flanged to prevent movement of the barrel 62 forward. The bearing by which roller 248 is mounted on shaft 23a is pinned to shaft 23a so that roller 248 may not move longitudinally.

The roller 250 is mounted slidably on a shaft 60. The shaft 60 must be moved axially in order to move flange 78 against the lower end 80 of the clutch bell crank best shown in FIG. 2. In order to accommodate such movement, a disk 252 is keyed to shaft 60 and is provided with peripheral holes. A plurality of rods, such as rod 254 extend from pinion 81 and bear against the inner race of the bearing on which roller 250 is mounted. Rods 254 slide through the peripheral holes in disk 252. Pinion 81 while not keyed to shaft 60 is prevented from moving axially because of a bearing surface 256 which contacts the race of the bearing (not shown) in the front panel member 258. By this means the flange roller 250 is prevented from moving towards the front of the unit and thus serve to position the barrel 62, preventing forward movement thereof at the same time, rotation of knob 23 is transmitted to belt 112.

Motor 46 is shown located above a pressure sensitive switch unit 260. Switch 260 provides the pilot with an indication when air pressure leading to the gyro 32 is low or off. Synchro resolver 234 is shown centered in the housing 10.

As previously noted, FIG. 8 illustrates the support system for the barrel 62 which includes a roller 103c disposed on the upper portion of the barrel 62 and a pair of rollers 103a–b disposed on the underside of the barrel 62. While this arrangement allows rotation of the barrel 62 and of the heading card 12, this support arrangement is difficult to adjust in order to center the heading card 12 within the housing. Due to machine tolerances, the heading card and display elements are often not exactly centered and thus some slight adjustment must be made.

Figure 9:
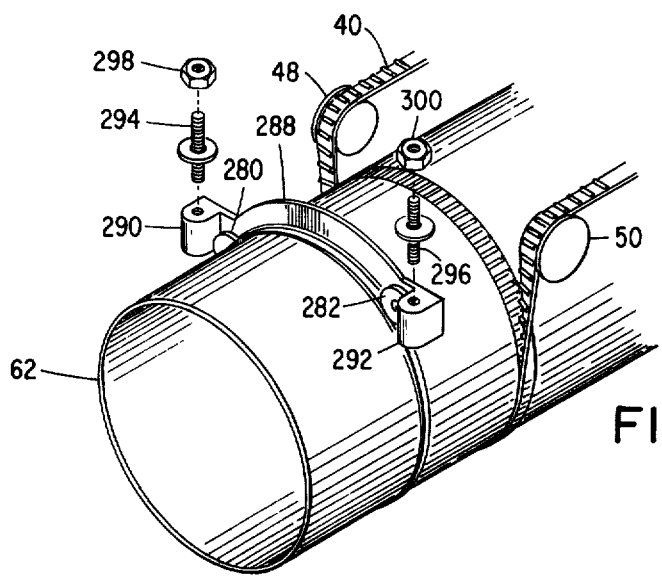
FIG. 9 is a perspective view of an improved support system for the barrel of the invention.
Figure 10:
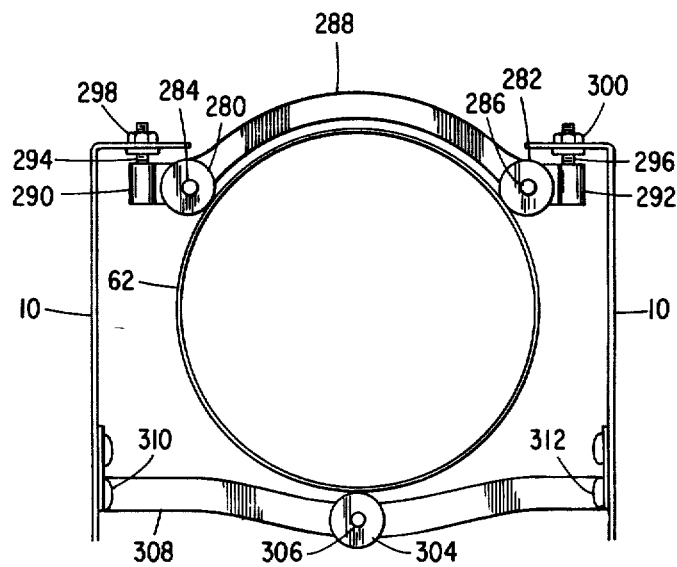
FIG. 10 is a front view of the barrel support system of FIG. 9, with the heading card removed.

FIGS. 9 and 10 illustrate an improved embodiment of a support system for the barrel 62 and heading card 12, wherein the heading card may be easily and accurately adjusted in order to provide exact centering, while providing rotative support for the barrel 62. FIG. 9 is a prespective view of the improved embodiment of the invention, with the heading card 12 removed for simplicity of illustration and with portions exploded for clarity. In addition, the rear bearing 140 which supports the barrel 62 for rotation about the barrel axis is omitted for clarity of illustration. The improved support system of the invention includes a pair of rollers 280 and 282 which are freely rotatable about fixed axes 284 and 286 as shown in FIG. 10. Axes 284 and 286 are fixedly mounted to a curved yoke 288 which includes end extensions 290 and 292. Extensions 290 and 292 include threaded aperatures for receiving the end of connection bolt 294 and 296. The upper ends of the bolts 294 and 296 are received through aperatures and the housing 10 and nuts 298 and 300 rigidly secure the connection bolts 294 and 296 to the housing 10.

The rollers 280 and 282 are positioned to bear against the upper portion of the barrel 62. A third roller 304 is mounted about a fixed axis 306 which is connected to a bottom yoke 308 which extends across the housing 10 and is rigidly attached to the housing 10 by screws 310 and 312 as shown in FIG. 10. The bottom of the barrel 62 thus rests upon the freely rotatable roller 304. The rollers 304, 280 and 282 are generally equally distance spaced about the periphery of the barrel 62 and thus provide rotative support to the barrel 62. When it is desired to vary the position of the barrel 62 to the housing 62 to the housing 10, nuts 298 and 300 may be loosened or tightened in order to adjust the position of the yoke 288. The position of the barrel 62 may thus be very accurately adjusted relative to the housing 10 to accurately center the heading card 12 relative to the housing 10 and to the other displays. As shown in FIG. 9, belt 40 runs over idler rollers 48 and 50 in order to drive the barrel 62 in the manner previously described. Due to the flexibility of the belt 40, the barrel 62 may be adjusted with the support device in the manner previously described.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an aircraft display including a generally horizontal barrel having a heading card and a bearing supporting the barrel at the rear end thereof for rotation about the axis of the barrel, the improvement comprising:
    a single roller rotatable about a fixed axis and disposed underneath the barrel to rotatably support the barrel,
    a pair of rollers spaced apart on the upper portion of the barrel for rotatable support of the barrel, and
    means for adjusting the relative position of said pair of rollers in order to enable centering of the heading card.

2. The combination of claim 1 wherein said adjusting means comprises:
    a fixed bracket,
    adjustment screws disposed through said fixed bracket, and
    extensions connected to said pair of rollers for threadedly receiving said screws to enable adjustment of said rollers relative to said fixed bracket.

3. The combination of claim 2 and further comprising:
    bracket means for rigidly interconnecting said pair of rollers.

4. The combination of claim 2 wherein said single roller and said pair of rollers are equally spaced about the periphery of said barrel.

5. A directional gyro indicator for aircraft comprising:
    a generally horizontal barrel having a heading card disposed normal to the barrel axis and located at the front end of said barrel,
    a bearing supporting said barrel at the rear end thereof to enable rotation of said barrel about the barrel axis,
    a roller rotatable about a fixed axis and disposed underneath said barrel to support said barrel,
    a plurality of rollers disposed on the upper side of said barrel and adjustable to enable centering of said heading card,
    a directional gyro supported behind said barrel,
    a tracking disk rotatably mounted on a vertical outer gimbal axis of said gyro,
    a pickoff for generating an error signal representative of the angular displacement between said tracking disk and said outer gimbal.
    transmission means coupling said disk and said barrel for equal rotation of said disk and barrel, and
    a servo motor drive for said transmission means responsive to an error signal generated from said pickoff for slaving said disk to said gyro.

6. The gyro indicator of claim 5 wherein said plurality of rollers comprises:
    a pair of rollers rotatable about spaced apart axes, and means for adjusting the position of said axes.

7. The gyro indicator of claim 6 wherein said adjusting means comprises:
    threaded bolts interconnecting said axes with a fixed housing.

8. The gyro indicator of claim 6 and further comprising: yoke means for rigidly interconnecting the axes of said pair of rollers.

9. A directional gyro indicator for aircraft comprising:
   a generally horizontal barrel having a radial flange intermediate its length and a heading card on the front end of said barrel,
   a single bearing supporting said barrel at the rear end thereof to enable rotation of said barrel,
   three rollers spaced about the periphery of said barrel for supporting and positioning said barrel by surface contact therewith, one of said rollers being disposed underneath said barrel and the other two said rollers being disposed on the upper portion of said barrel and being adjustable to enable centering of said heading card,
   a directional gyro supported behind said barrel,
   a tracking disk rotatably mounted on a vertical outer gimbal axis of said gyro,
   a pickoff for detecting the angular displacement between said tracking disk and said outer gimbal,
   a first flanged cylinder mounted on said barrel with the flanged surface facing one surface of said radial flange on said barrel,
   compression means normally biasing said surfaces together to clutch said cylinder to said barrel,
   a belt coupling said disk and said first flanged cylinder for equal rotation of said cylinder and disk,
   a servo motor drive for said belt responsive to an error signal from said pickoff for slaving said disk to said gyro, and
   a rotatable slideable shaft mounted parallel to the axis of said barrel and coupled to said compression means to declutch the flanges upon slide movement of said shaft and coupled to said barrel to rotate said barrel upon rotation of said shaft.

10. The gyro indicator of claim 9 wherein said rollers disposed on the upper portion of said barrel are rotatable about axes rigidly interconnected with one another.

11. The gyro indicator of claim 9 wherein said three rollers are spaced equidistantly about the periphery of said barrel.

* * * * *